Jan. 26, 1932.    R. WAGNER, JR    1,842,496
MOUNTING FOR BOOKS AND THE LIKE
Filed Jan. 20, 1931

INVENTOR
R. Wagner, Jr.
BY
ATTORNEY

Patented Jan. 26, 1932

1,842,496

UNITED STATES PATENT OFFICE

RICHARD WAGNER, JR., OF FLUSHING, NEW YORK, ASSIGNOR TO AMERICAN TELEPHONE AND TELEGRAPH COMPANY, A CORPORATION OF NEW YORK

MOUNTING FOR BOOKS AND THE LIKE

Application filed January 20, 1931. Serial No. 510,053.

This invention relates to mountings for books or the like, an object being to provide a mounting which will accommodate a series of various sizes of said articles.

Another object is to provide a mounting on which books or the like may be held in compact formation and occupy a relatively small space.

These and further objects will be apparent from the following description when considered in connection with the accompanying drawings in which one modification of the invention is illustrated.

Figure 1:
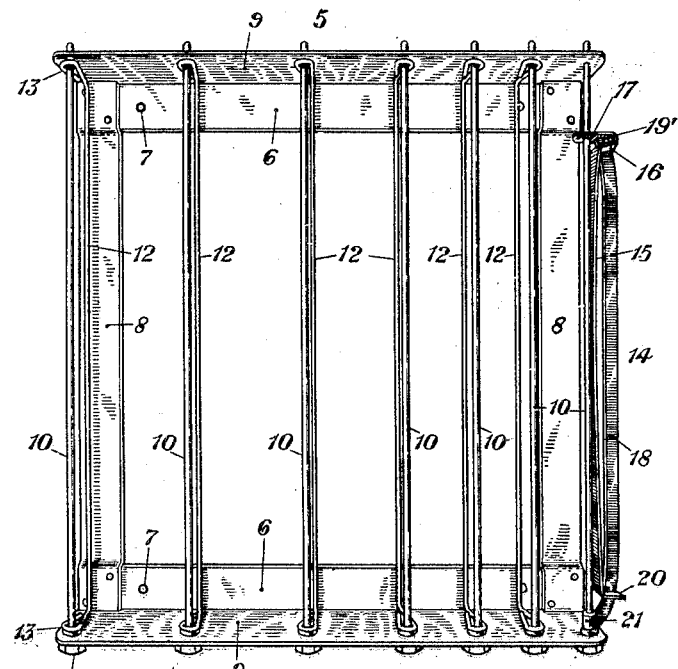
Figure 2:
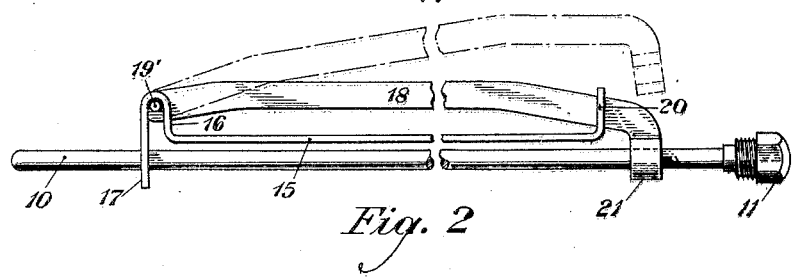
Figure 3:
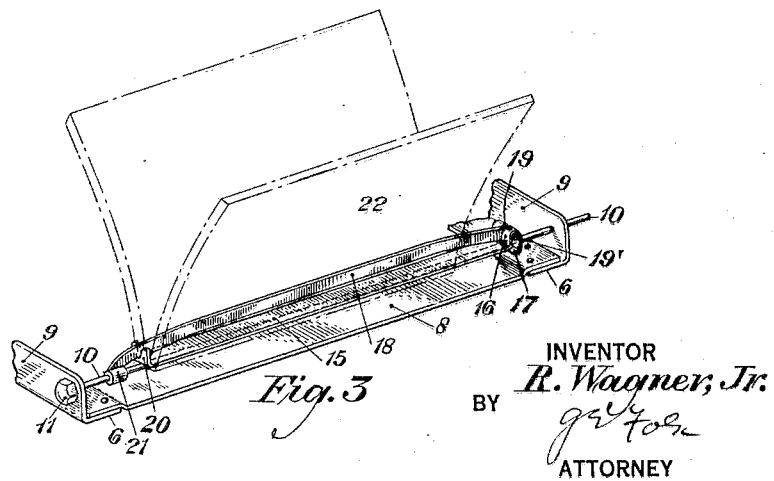

Referring to the drawings, Figure 1 is a plan view in perspective of the improved device; Fig. 2 is a side elevation of an adapter used in connection therewith and shown in its normal position in full lines, and in open position in dotted lines, and Fig. 3 is a perspective view of the adapter shown as having a book mounted thereon.

The invention as disclosed in the drawings include a frame or rack 5 of substantially rectangular form which, with its associated elements, may be made of any suitable metal. The frame 5 includes a pair of parallel base or supporting plates 6, 6 provided with apertures 7 through which screws may pass to secure the frame to a supporting surface. The plates 6, 6 may be secured together at their ends by flat strips 8, 8 which form sides for the frame and are suitably secured at their extremities to the plates 6, 6. The plates are provided with flanges 9, 9 which project outwardly therefrom and form a mounting for a series of parallel bolts 10. These bolts provide mounting for books, directories, or the like, and are suitably spaced from each other in accordance with the thickness of the books, or the like, which are to be carried thereby. The bolts are threaded at one of their extremities to engage openings in the flanges 9, 9, and an enlarged head 11 is provided on one end of said bolts by means of which they may be rotated to engage and disengage the threaded openings in the flanges 9, 9.

A rod 12 having alined loop portions 13 formed at its ends, and which extend at substantially right-angles therefrom, is carried on each of the bolts 10 between the flange portions 9, 9 of the frame. The bolts pass through the loop portions and provide axes about which the rods may rotate. The lengths of the loop portions are such as to space the rods away from the bolts sufficiently to permit a book, directory or the like, when opened at its approximate middle, to be positioned in clamped relation between an associated bolt and rod so that it may rotate with the rod.

The bolts 10 may be provided with one or more adapters which may be attached thereto in place of the rods 12 to provide mountings for books, directories or the like, of a size smaller than those carried on the other bolts and associated rods. This adapter is shown in Fig. 1 as being attached to the bolt at the right of the frame 5. It is to be understood, however, that the adapter may be attached, if desired, to other of the bolts. The adapter is rotatably associated with the bolt and includes an elongated plate member 15 which forms a support against which the back of the book or the like may rest. The plate 15 is provided at one end with an angular extension 16 which is turned upon itself and terminates in a flange 17. This flange is perforated to permit the bolt 10 to be inserted therethrough to form a bearing for one end of the adapter. A flat strip 18 is mounted on the plate member 15 and its flat surface extends in a plane at right-angles to the flat surface of said plate member. One end of the flat strip 18 extends through a slot 19 in the flange 17 of the plate 15, and is provided with a pin 19' which passes through the strip and forms a trunnion therefor. This trunnion is seated in operative position in the rounded portion formed by the extension 16 and the flange 17. The strip 18 may extend in a generally parallel position with respect to the plate 15. The other end of the strip 18 extends through a slot in the flange portion 20 on the extremity of the plate 15 and terminates in a looped or perforated shoulder 21. The bolt 10 which carries the adapter 14 passes through this shoulder and forms a bearing for that end of the adapter. As the other end of the adapter is mounted, as previously described, it will be apparent that the adapter is rotatably mounted on said bolt. It will be noted that the ends of the strip 18 are bent in the plane of the strip to provide a direct clamping action on the ends of a book, binder or the like which is carried by the adapter. An additional clamping action on the staples or other binding devices for the books is also provided by the bent portions in cooperation with the plate 15.

A space is provided between the plate member and the strip 18 to permit a book, directory or the like, such as shown at 22 in Fig. 3 when opened, to be clamped in locked position between these interlocked members so that it may rotate with the adapter 14 on a bolt 10.

The manner of operation and use of the device described herein and disclosed in the drawings, is as follows: A series of books, directories or the like, is adapted to be mounted on the spaced bolts and their associated rotatable rods in accordance with the thickness of the books, or the like. A bolt is unscrewed and partially or wholly removed from the frame to permit its associated rod to be detached at one or both ends therefrom. This rod is then inserted at the approximate middle portion of the pages of the book, directory or the like, after which the rod is replaced on its bolt, and will lie in such position that the back of the book, directory or the like will be held in clamped position between the bolt and rod. The bolt is then attached to the frame and the book is thus adapted to be rotated around the bolt.

A somewhat similar operation is performed in the mounting of a book, directory or the like on the adapter, in so far as removing and replacing the bolt is concerned. In the case of the adapter, after the removal of the bolt from the frame, the adapter is free from the bolt. The flat metal strip 18 is then rotated on its trunnion bearing to an open position. The book or the like which is to be carried by the adapter, is then placed with its back against the inner surface of the plate 15, with its pages separated in the approximate middle portion for the reception of the flat strip 18. The flat strip 18 may be now replaced by rotating it in a direction opposite to that just described to cause its free end to again register in the slot in the flange 20 of the plate 15. When the elements 15 and 18 are thus positioned they clamp the book, directory or the like between them as formerly described. Under this condition the looped shoulder 21 will be extended beyond the plate 15 and will be in alinement with its companion bearing for the bolt 10, formed by the perforation in the flange 17. The end of the bolt 10 is introduced through an aperture in the lower flange 9 of the frame and through the looped shoulder and engages the back of the plate 15. This engagement causes the members 15 and 18 to be locked together and also facilitates the advancement of the bolt through the opening in the flange 17 so that it may be readily positioned in the aperture of the upper flange of the frame 5.

To disengage a book or the like, from the frame or from the adapter it is only necessary to unscrew and withdraw the bolts in the manner outlined and release the book.

It will be apparent from the above that by means of this invention a mounting is provided which is adapted to carry a plurality of books, or the like, of various thicknesses or dimensions in a compact and accessible formation.

What is claimed is:

1. A mounting for books or the like including a frame, a series of supports on the frame for carrying books of a certain size, and means including interlocking members rotatably mounted on one of said supports for carrying a book of another size.

2. A mounting for books or the like including a frame, a series of supports on the frame for carrying books of a certain size, and an adapter mounted on one of said supports for carrying a book of another size.

3. A mounting for books or the like including a frame, a series of parallel supports mounted on the frame in spaced relation to each other for carrying books of a certain size, and means including adapters mounted on said supports for carrying books of a different size.

4. A mounting for books or the like including a frame, a series of parallel bolts attached thereto and having rotatable rods mounted thereon for carrying books of a certain size, and means rotatably connected with one of said bolts for carrying a book of a different size.

5. A mounting for books or the like including a frame, a series of parallel bolts secured thereto in spaced relation from each other, means rotatably mounted on the bolts and cooperating therewith to carry books of a certain size, and means rotatably mounted on one of said bolts for carrying a book of a different size.

6. A mounting for books or the like including a frame, a series of parallel bolts secured thereto in spaced relation from each other, means rotatably mounted on the bolts and cooperating therewith to carry books of a certain size, and an adapter rotatably mounted on one of said bolts for carrying a book of another size.

7. A mounting for books or the like including a frame, a series of parallel supports mounted on the frame in spaced relation to each other, means rotatably mounted on the supports and cooperating therewith to carry books of a certain size, and an adapter mounted on one of said supports for carrying a book of a different size, said adapter having a pair of flat elongated members extending in a plane at right-angles to each other, and each having an end portion bent to form a bearing in which the support for the adapter registers to interlock the elongated members.

8. A mounting for books or the like including a frame, a series of parallel supports attached thereto, rods rotatively mounted on the supports and cooperating therewith to carry books of a certain size in clamped position, and clamping plates rotatably connected with one of said supports for carrying a book of a different size, said clamping plates including a pair of members each terminating in a bearing through which the support for the clamping plates extends to interlock said members.

9. A mounting for books or the like including a frame, series of parallel supports secured thereto in spaced relation from each other, means rotatably mounted on the supports and cooperating therewith to carry books of a certain size, an adapter rotatably mounted on one of said supports for carrying a book of another size, said adapter including a pair of flat elongated members extending in a plane at right-angles to each other, one of said members providing a support for a book and the other of said members providing a separation between the pages of the book, and angular portions on the ends of the adapter so engaged by its support as to interlock the elongated members to clamp a book therebetween.

10. A mounting including a frame, a pair of hingedly connected book-engaging members, a bearing formed on one end of each of the book-engaging members, and a supporting member secured to said frame and registering in said bearings for interlocking said book-engaging members.

11. A mounting including a frame, a pair of hingedly connected book-engaging members, a bearing formed at one end of each of said members, and a supporting member secured to said frame and registering in said bearings for interlocking said members to cause them to exert a clamping action on the book carried thereby.

12. A mounting for books and the like having a frame, a pair of flat elongated members extending in planes substantially at right-angles to each other, one of said members providing a support for a book and the other of said members providing a separation between the pages of the book, and a support for the elongated members secured to the frame.

13. A mounting for books and the like having a frame, a pair of flat elongated members interengaging each other and extending in planes substantially at right-angles to each other, one of said members providing a support for a book and the other of said members providing a separation between the pages of the book, a bearing member on one end of each of said elongated members, and a support secured to said frame and registering in said bearing members the interengagement of said elongated members being such as to then hold a book in clamped position therebeween.

In testimony whereof, I have signed my name to this specification this 19th day of January, 1931.

RICHARD WAGNER, JR.